United States Patent [19]

Tohjo et al.

[11] Patent Number: 5,695,144
[45] Date of Patent: Dec. 9, 1997

[54] TAPE CASSETTE HAVING ANTI-STATIC PROPERTIES COMPRISING ANTI-STATIC RESIN

[75] Inventors: Takehiko Tohjo; Haruomi Enomoto, both of Tochigi-ken, Japan

[73] Assignee: Kao Corporation, Tokyo, Japan

[21] Appl. No.: 531,348

[22] Filed: Sep. 20, 1995

[30] Foreign Application Priority Data

Oct. 3, 1994 [JP] Japan .................. 6-239178

[51] Int. Cl.$^6$ ............................. G11B 23/04
[52] U.S. Cl. ........................ 242/347; 242/348
[58] Field of Search .................. 242/347, 347.1, 242/347.2, 348; 360/132

[56] References Cited

U.S. PATENT DOCUMENTS

| | | | |
|---|---|---|---|
| 4,570,197 | 2/1986 | Hakanson et al. | 360/132 |
| 4,754,357 | 6/1988 | Nelson | 360/132 X |
| 4,766,511 | 8/1988 | Miyoshi et al. | 360/132 |
| 4,767,007 | 8/1988 | Oishi et al. | 360/132 X |

*Primary Examiner*—John Q. Nguyen
*Attorney, Agent, or Firm*—Oblon, Spivak, McClelland, Maier & Neustadt, P.C.

[57] ABSTRACT

The tape cassette (10) of the present invention comprises a cassette body comprising an upper half (1) and a lower half (2), and an openable lid (3) provided at the front end of the cassette body. The tape cassette is characterized in that the upper half (1), the lower half (2) and the lid (3) comprise an anti-static resin.

4 Claims, 1 Drawing Sheet

TAPE CASSETTE HAVING ANTI-STATIC PROPERTIES COMPRISING ANTI-STATIC RESIN

BACKGROUND OF THE INVENTION

1. Field of the Invention

This invention relates to a tape cassette having good anti-static properties.

2. Description of Related Art

Conventional tape cassettes, such as video tapes cassettes and digital audio tape (DAT) cassettes, have been configurated such that the tape cassette comprises a cassette body comprising an upper half and a lower half, and an openable lid provided at the front end of the cassette body.

In these tape cassettes, a magnetic layer of a magnetic tape is protected by the lid.

However, the conventional tape cassettes have the problems that the tape and members of the cassette become electrostatically charged due to friction between the tape and the members of the cassette, and therefore dust, debris, or the like, adhere to the tape and the members of the cassette. In such cases, the problems of reading errors and operation failures occur. Also, the problems that the tape adheres to the members of the tape cassette occurs, resulting in failure in loading the tape cassette.

Therefore, recently, in order to solve the problems described above, a tape cassette has been proposed in which a permanent anti-static resin is used in only either one of the cassette body and the lid. However, even with the proposed tape cassette, the probability that the tape and the members of the tape cassette will adhere to each other cannot be kept low, and there is a high possibility of failure in loading the tape cassette.

SUMMARY OF THE INVENTION

It is therefore an object of the present invention to provide a tape cassette having good anti-static properties.

The inventors carried out extensive research and found that the object can be accomplished by a tape cassette, in which all of an upper half, a lower half, and a lid comprise an anti-static resin.

The present invention is based on such findings. Specifically, the present invention provides a tape cassette comprising: a cassette body comprising an upper half and a lower half; and an openable lid provided at the front end of the cassette body, characterized in that the upper half, the lower half and the lid comprise an anti-static resin.

With the tape cassette in accordance with the present invention, wherein all of the upper half, the lower half and the lid comprise an anti-static resin, advantageous effects of preventing electrostatic charging due to tape movement, or the like, can be obtained.

DETAILED DESCRIPTION OF THE PREFERRED EMBODIMENT

Figure 1:
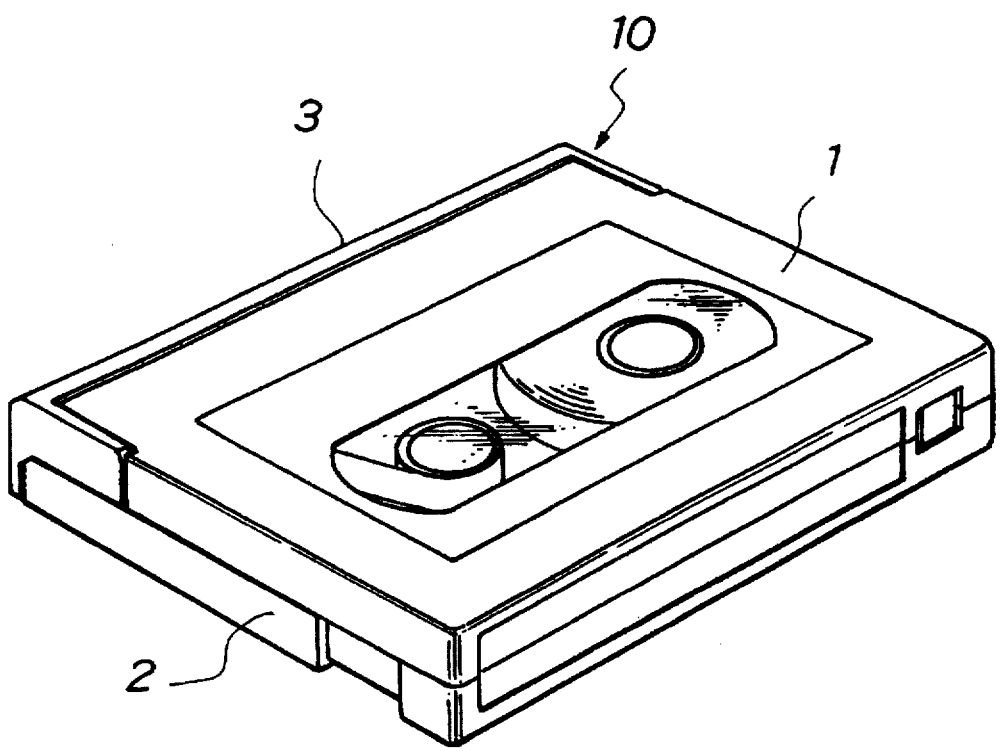
FIG. 1 is a perspective view showing an embodiment of the tape cassette in accordance with the present invention which is configurated for a DAT cassette.

The present invention will hereinbelow be described in further detail with reference to the accompanying drawing and by a nonlimitative example.

With reference to FIG. 1, a tape cassette 10 comprises a cassette body comprising an upper half 1 and a lower half 2, and an openable lid 3 provided at the front end of the cassette body.

The upper half 1, the lower half 2, and the lid 3 have the same shapes as those in conventional tape cassettes.

In the tape cassette in accordance with the present invention, the upper half 1, the lower half 2, and the lid 3 comprises an anti-static resin. The surface specific resistance of the anti-static resin is preferably about $1\times10^{12}$ $\Omega/\square$ or less, and more preferably about $1\times10^{8}$ $\Omega/\square$ to $1\times10^{12}$ $\Omega/\square$.

The anti-static resin having a surface specific resistance of $1\times10^{12}$ $\Omega/\square$ or less can enhance the prevention of the peripheral members from being electrostatically charged, which is due to the electrostatic induction effect.

The surface specific resistance is determined in accordance with ASTM D257.

In the present invention, the upper half 1, the lower half 2 and the lid 3 may comprise the same anti-static resin or different anti-static resins, respectively.

The anti-static resins satisfying the requirement with respect to the surface specific resistance defined above are not limited to specific ones and include permanent anti-static resins of styrene polymers (i.e., homopolymers and copolymers of styrene). Examples of such anti-static resins include a permanent anti-static ABS (Acrylonitrile-butadiene styrene) resin available under the trade name of Parel (supplied by Toray Industries, Inc.), a permanent anti-static HIPS (High-Impact-Polystyrene) resin available under the trade names of ADION (supplied by Asahi Chemical Industry, Co., Ltd.) and SUMIBRITE ELEX, and a permanent anti-static GPPS (General Purpose Polystyrene) resin, with the permanent anti-static ABS resin being preferred in view of the advantageous anti-static effects.

The anti-static resin preferably has a coefficient of friction of about 0.3 or less and a flexural modulus of about 20,000 kg/cm² or more. If the coefficient of friction exceeds 0.3, the friction between the anti-static resin and the respective slidable members may unfavorably become large, thereby generating rubbed powder. If the flexural modulus is smaller than 20,000 kg/cm², the anti-static resin may be unfavorably liable to be subjected to deformation due to external stresses, adversely affecting running performance or operability of the tape. The anti-static resin more preferably has a coefficient of friction of about 0.25 less and a flexural modulus of about 25,000 kg/cm² or more.

The present invention will further be illustrated by the following nonlimitative example and comparative examples.

EXAMPLE 1 AND COMPARATIVE EXAMPLES 1 TO 3

An upper half, a lower half, and a lid made of the anti-static resin or the conventional resin shown in Table 1 were prepared. Then, tape cassettes having the structure shown in FIG. 1 were assembled.

TABLE 1

|  |  | Resin | Attenuation Time of Charged Voltage (Second) |
|---|---|---|---|
| Example 1 | Lid | Anti-static resin | 30 |
|  | Upper and lower halves | Anti-static resin |  |
| Comparative Examples | 1 Lid | Conventional resin | ≧240 |
|  | Upper and lower halves | Conventional resin | (little attenuation) |
|  | 2 Lid | Anti-static resin | ≧240 |
|  | Upper and lower halves | Conventional resin | (little attenuation) |
|  | 3 Lid | Conventional resin | ≧240 |
|  | Upper and lower halves | Anti-static resin | (little attenuation) |

Anti-static resin: Permanent anti-static ABS resin "Parel" (Surface Specific Resistance $2 \times 10^{11} \Omega/\square$ Coefficient of Friction 0.20, Flexural Modulus 26000 kg/cm$^2$)
Conventional resin: General grade of ABS resin (having no anti-static properties) (Surface Specific Resistance $5 \times 10^{16}$ $\Omega/\square$ Coefficient of Friction 0.35, Flexural Modulus 26000 kg/cm$^2$)

As for the tape cassettes obtained in Example 1 and Comparative Examples 1 to 3, the anti-static properties were evaluated with the method described below. The results obtained are shown in Table 1. As is apparent from the results in Table 1, the anti-static properties of the tape cassette obtained in Example 1 were markedly good. The anti-static properties of the tape cassettes obtained in Comparative Examples 1 to 3 were insufficient.

(Evaluation of Anti-Static Properties)

The lid of the tape cassette was subjected to corona discharge at 10 kV. Thereafter, the time required for the charged voltage to attenuate to 0.5 kV or less was measured by a charge voltmeter (KSD-0101M supplied by Kasuga K.K.).

Evaluation of the Performance of the Tape Cassettes

Twenty tape cassettes obtained in Example 1 and twenty tape cassettes obtained in each of Comparative Examples 1 to 3 were respectively loaded with tapes having a width of 3.81 mm. In each tape cassette, the tape was slackened by 7.4 mm. The tape cassette was then allowed to stand for 24 hours under the environmental conditions of 23° C. and 17% relative humidity. Thereafter, the tape cassette was loaded into a cassette deck, and occurrence of tape adhesion to the lid or the upper and lower halves and the failure in loading the tape cassette were evaluated. The results shown in Table 2 were obtained.

TABLE 2

|  |  | Test Conditions (23° C., 17% RH) Tape-slack: 7.4 mm (2 ratchet move) | | |
|---|---|---|---|---|
|  |  | Adhesion of Tape |  | Failure in Loading Cassette |
| Example 1 |  | Adhere to lid | 0/20 | Not observed |
|  |  | Adhere to upper and lower halves | 0/20 | Not observed |
| Comparative Examples | 1 | Adhere to lid | 8/20 | 7 Misloading |
|  |  | Adhere to upper and lower halves | 5/20 | 3 Misloading |
|  | 2 | Adhere to lid | 2/20 | 2 Misloading |
|  |  | Adhere to upper and lower halves | 8/20 | 7 Misloading |
|  | 3 | Adhere to lid | 5/20 | 3 Misloading |
|  |  | Adhere to upper and lower halves | 0/20 | Not observed |

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

What is claimed is:

1. A tape cassette comprising:
   a cassette body comprising an upper half, a lower half and a front end; and
   an openable lid provided at the front end of the cassette body,
   wherein the material forming the structure of the upper half, the lower half and the lid consists essentially of an anti-static resin having a surface specific resistance of about $1\times10^{12}$ $\Omega/\square$ or less, and a coefficient of friction of 0.3 or less.

2. The tape cassette according to claim 1, wherein said anti-static resin has a surface specific resistance of about $1\times10^{8}$ to $1\times10^{12}$ $\Omega/\square$.

3. The tape cassette according to claim 1, wherein said anti-static resin is a permanent anti-static resin of styrene polymers.

4. The tape cassette according to claim 1, wherein said anti-static resin has a flexural modulus of about 20,000 $kg/cm^2$ or more.